United States Patent
Darmawaskita et al.

[11] Patent Number: 5,899,570
[45] Date of Patent: May 4, 1999

[54] TIME-BASED TEMPERATURE SENSOR SYSTEM AND METHOD THEREFOR

[75] Inventors: Hartono Darmawaskita; James B. Nolan, both of Chandler, Ariz.

[73] Assignee: Microchip Technology Incorporated, Chandler, Ariz.

[21] Appl. No.: 08/827,516

[22] Filed: Mar. 28, 1997

[51] Int. Cl.$^6$ .................................................. G01K 7/00
[52] U.S. Cl. .................... 374/170; 374/171; 702/130; 377/25; 377/49
[58] Field of Search .................................. 374/170, 171; 377/25, 49; 364/557; 702/130

[56] References Cited

U.S. PATENT DOCUMENTS

| | | | |
|---|---|---|---|
| 4,150,573 | 4/1979 | Iinuma et al. | 374/170 |
| 4,370,070 | 1/1983 | Leroux | 364/557 |
| 4,464,067 | 8/1984 | Hanaoka | 374/170 |
| 4,493,565 | 1/1985 | Saka | 377/25 |
| 4,505,599 | 3/1985 | Nonaka | 374/170 |
| 4,648,055 | 3/1987 | Ishizaka et al. | 364/557 |
| 4,658,407 | 4/1987 | Iwama | 377/25 |
| 4,771,393 | 9/1988 | Ishida et al. | 364/557 |
| 4,875,783 | 10/1989 | Swanson | 374/170 |
| 5,214,668 | 5/1993 | Satou et al. | 374/170 |
| 5,388,134 | 2/1995 | Douglass et al. | 374/170 |
| 5,621,184 | 4/1997 | Gwynn, III | 102/215 |
| 5,638,418 | 6/1997 | Douglass et al. | 377/25 |

*Primary Examiner*—Diego Gutierrez
*Attorney, Agent, or Firm*—Harry M. Weiss; Jeffrey D. Moy; Harry M. Weiss & Associates, P.C.

[57] ABSTRACT

A time-based digital temperature sensing system has a first oscillator which is temperature sensitive. The first oscillator has a temperature coefficient which allows the first oscillator to generate an output signal which varies linearly as a function of temperature. A second oscillator is provided and is used to generates a reference clock signal. The outputs from the first and the second oscillator are coupled to a timer. The timer has a clock input coupled to an output of the second oscillator and an enable input coupled to an output of the first oscillator. From these input signals, the timer generates a number indicative of a length of time the timer is enabled by the first oscillator. The number is proportional to a current temperature of a material that is being monitored by the temperature sensing system.

24 Claims, 2 Drawing Sheets n = ∝ TEMPERATURE

TIME-BASED TEMPERATURE SENSOR SYSTEM AND METHOD THEREFOR

BACKGROUND OF THE INVENTION

FIELD OF THE INVENTION

This invention relates generally to temperature sensing and, more specifically, to a time-based system for measuring temperature using two dissimilar oscillators. The first oscillator is used to generate an output signal that has a period that is linearly dependent on temperature. The second oscillator is used to generate a reference clock signal that is used to measure the period of the output signal generated by the first oscillator.

DESCRIPTION OF THE PRIOR ART

Currently, there are several different types of low-cost temperature sensing systems. One common type of system uses silicon temperature sensors. The sensors operate by measuring a small differential voltage signal generated by a Proportional To Absolute Temperature (PTAT) circuit. The sensors then pass the voltage signal through a differential amplifier. The output signal produced by the differential amplifier is a single-ended voltage that is directly proportional to the temperature. The output signal of the differential amplifier is then converted to a digital representation of the measured temperature using an Analog-To-Digital (A/D) converter.

While this type of system does work, it has several potential sources of error. Specifically, the potential sources of error include those found in the PTAT stage, the differential amplifier, the A/D converter, and the A/D reference. These errors are normally uncorrelated and can sum up to degrade the overall accuracy of the measurement. This requires an increase in the precision requirements of the analog components of the system which substantially increases the cost of the system. Calibration cost also increases since a precision analog test fixture may be required. Another problem with this type of system is that the signal levels generated by the PTAT circuit can be extremely small (i.e., millivolts). When noise is injected into the PTAT stage, the noise can be amplified by the differential amplifier thereby degrading resolution.

Therefore, a need existed to provide an improved temperature sensing system. The improved system must be inexpensive to build and easy to implement. The improved system must be able to accurately measure the temperature by reducing the potential sources of error that are present in current systems and methods. Thus, the precision to cost ratio must be substantially higher than previous systems and methods.

SUMMARY OF THE INVENTION

In accordance with one embodiment of the present invention, it is an object of the present invention to provide an improved temperature sensing system and method.

It is another object of the present invention to provide an improved temperature sensing system and method that is inexpensive to build and easy to implement.

It is another object of the present invention to provide an improved temperature sensing system and method that is able to accurately measure the temperature by reducing the potential sources of error that are present in current systems and methods.

It is still another object of the present invention to provide an improved temperature sensing system and method that has a precision to cost ratio that is substantially higher than previous systems and methods.

BRIEF DESCRIPTION OF THE PREFERRED EMBODIMENTS

In accordance with one embodiment of the present invention, a time-based digital temperature sensing system is disclosed. The system has a first oscillator which is temperature sensitive. The first oscillator has a temperature coefficient which allows the first oscillator to generate an output signal that has a period which varies linearly as a function of temperature. A second oscillator is provided and is used to generate a reference clock signal. The outputs from the first and the second oscillator are coupled to a timer means. The timer means have a clock input coupled to an output of the second oscillator and an enable input coupled to an output of the first oscillator. From these input signals, the timer means generates a number indicative of a length of time the timer means is enabled by the first oscillator. The number is proportional to a current temperature of a material that is being monitored by the temperature sensing system.

In accordance with another embodiment of the present invention, a method of providing a time-based digital temperature sensing system is disclosed. The method comprises the steps of: providing a first oscillator which is temperature sensitive and has a temperature coefficient which allows the first oscillator to generate an output signal that has a period which varies linearly as a function of temperature; providing a second oscillator which generates a reference clock signal; and providing timer means having a clock input coupled to an output of the second oscillator and an enable input coupled to an output of the first oscillator for generating a number indicative of a length of time the timer means is enabled by the first oscillator wherein the number is proportional to a current temperature of a material being measured by the temperature sensing system.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
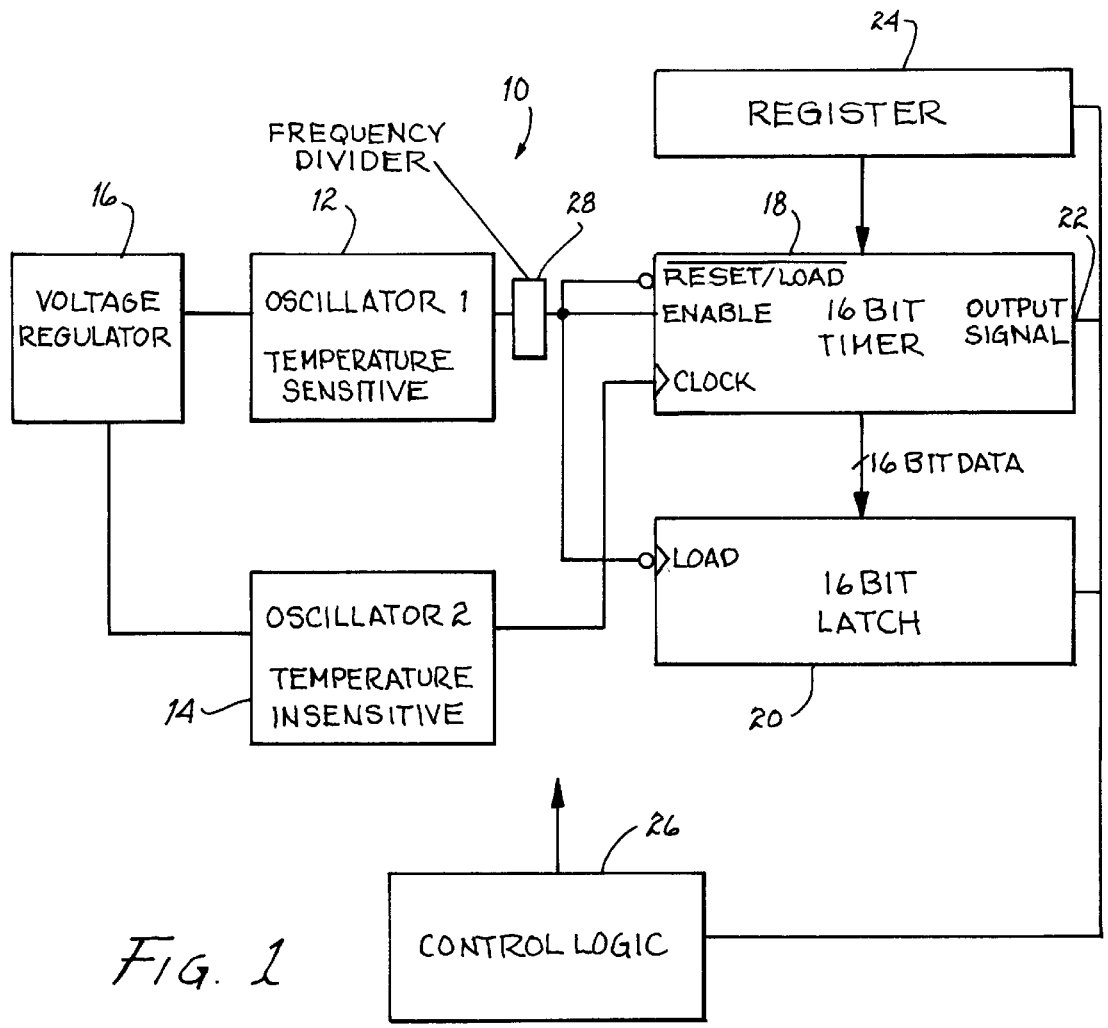
FIG. 1 is a simplified functional block diagram of the time-based temperature sensing system of the present invention.

Referring to FIG. 1, a time-based digital temperature sensing system 10 (hereinafter system 10) is shown. The system 10 has a first oscillator 12 which is temperature sensitive. The first oscillator 12 has a temperature coefficient which allows the first oscillator 12 to generate an output signal that has a period which varies linearly as a function of temperature. By measuring the period of the output signal, the temperature of a die surface which is coupled to the first oscillator 12 may be calculated. This is due to the fact that the output signal varies linearly as a function of temperature. Thus, a straight line equation may be used to calculate the temperature of the die surface based on the period of the output signal.

A second oscillator 14 is used to generate a reference clock signal to measure the period of the output signal generated by the first oscillator 12. In order to produce more accurate readings, in the preferred embodiment of the present invention, the second oscillator 14 must generate a reference clock signal that has a frequency that does not fluctuate with changes in the temperature. Thus, in the preferred embodiment of the present invention, the second oscillator 14 is temperature insensitive. The second oscillator 14 can be easily built to minimize frequency drift by employing a low cost crystal oscillator to generate the reference clock signal. In the preferred embodiment of the present invention, the reference clock signal generated by the second oscillator 14 should be set at a higher frequency than the frequency of the output signal generated by the first oscillator 12. In order to ensure that the reference clock signal generated by the second oscillator 14 is at a higher frequency than the frequency of the output signal generated by the first oscillator 12, a frequency divider 28 may be coupled to the output of the first oscillator 12. The frequency divider 28 may be used to slow down the output signal of the first oscillator 12.

In order to increase the accuracy of the system 10, a voltage regulator 16 is provided. The first oscillator 12 and the second oscillator 14 may be sensitive to voltage fluctuations. For this reason, a voltage regulator 16 may be used to supply a constant operating voltage to either or both the first oscillator 12 and the second oscillator 14. By supplying a constant operating voltage to either or both the first oscillator 12 and the second oscillator 14, the output signal generated by the first oscillator 12 and the reference clock signal generated by the second oscillator 14 will be independent of operating voltage fluctuations.

A timer 18 is provided in order to measure the period of the output signal generated by the first oscillator 12 (i.e., the temperature sensitive oscillator). The output of the second oscillator 14 is used as a clock input signal to the timer 18. The clock input signal is used to clock the timer 18 from an initial value. The output of the first oscillator 12 (i.e., the temperature sensitive oscillator) is coupled to an enable input of the timer 18. The output of the first oscillator 12 is used as a gating signal to enable the timer 18. When the output of the first oscillator 12 is high, the timer 18 is enabled. When enabled, the timer 18 will generate a number indicative of the length of the period of the output signal generated by the first oscillator 12. One way the timer 18 could monitor the length of the period of the output signal is to increment the timer 18 on every rising edge of the clock input signal when the timer 18 is enabled by the first oscillator 12. The number generated by the timer 18 would be proportional to the ratio between the frequency of the first oscillator 12 and the second oscillator 14 which is further proportional to the temperature of the material being measured by the system 10.

In accordance with one embodiment of the present invention, the output of the first oscillator 12 is also coupled to a reset/load input of the timer 18. The reset/load input of the timer 18 is used for resetting the number stored in the timer 18 (i.e., the number indicative of the length of time the timer 18 is enabled) to an initial value or for loading an initial starting value into the timer 18. Every time the first oscillator 12 goes low, the timer 18 will be disabled and the number stored in the timer 18 will be reset or loaded with an initial starting value.

In the present embodiment, a latch 20 is coupled to an output of the timer 18. The latch 20 takes the number generated by the timer 18 prior to the timer 18 being reset. Thus, the latch 20 will hold a value proportional to the ratio between the frequency of the first oscillator 12 and the second oscillator 14 which is further proportional to the temperature of the material being monitored.

In accordance with another embodiment of the present invention, the timer 18 has a signalling circuit 22 for generating a signal which is used for setting either or both of a high and/or a low temperature. The signalling circuit 22 will generate a signal when the number stored in the timer 18 exceeds a maximum predetermined value and/or is below a minimum predetermined value. The maximum predetermined value is set to be proportional to a maximum temperature value, while the minimum predetermined value is set to be proportional to a minimum temperature value. Instead of resetting the number stored in the timer 18, a register 24 may be used for loading an initial starting value into the timer 18. In this embodiment, the system 10 will continuously monitor the temperature. When the current number in the timer 18 exceeds the preset maximum value or is below the preset minimum value, the signalling circuit 22 of the timer 18 will generate an interrupt signal. The interrupt signal could be used to generate an alarm signal, turn off the equipment using the system 10, or any of a number of other applications. When the current number stored in the timer 18 is below the maximum value or above the minimum value, no interrupt signal will be generated, and the equipment using the system 10 will operate uninterrupted.

In all of the embodiments cited above, a control module 26 is used to control the operation of the system 10. The control module 26 could be used to set up different modes of operation (i.e., free run mode, run on demand, interrupt signalling mode, etc.). The control module 26 could also be used to coordinate the transfer of data between the different elements of the system 10. For example, the control module could be used to coordinate the transfer of the number stored in the timer 18 to the latch 20 prior to the timer 18 being reset. The control module 26 could also be used to coordinate the loading of the initial starting value from the register 24 into the timer 18.

In accordance with another embodiment of the present invention, the second oscillator 14 is a temperature dependent oscillator. However, the second oscillator 14 must have a temperature coefficient which is different from the temperature coefficient of the first oscillator 12. In this embodiment, the timer 18 will store a number which is proportional to the current temperature with an effective temperature coefficient of the difference between the two temperature coefficients of the two oscillators 12 and 14.

Figure 3:
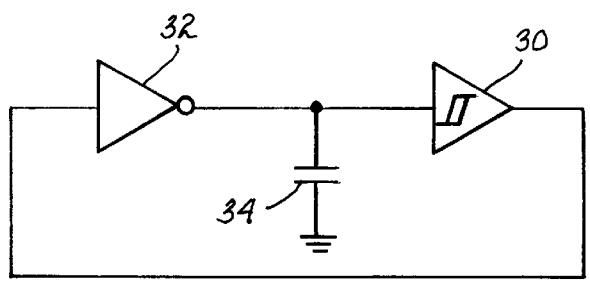
FIG. 3 is a simplified electrical schematic of one embodiment of a temperature sensitive oscillator used in the time-based temperature sensing system depicted in FIG. 1.

Referring to FIG. 3, wherein like numerals and symbols represent like elements, one embodiment of the temperature sensitive oscillator 12 is shown. In this embodiment, the temperature sensitive oscillator uses a Schmitt buffer 30 for generating a digital output signal. The output of the Schmitt buffer 30 is coupled to a weak inverting stage 32 whose output charging current varies linearly as a function of temperature. A capacitor 34 is coupled to the output of the weak inverting stage 32. The capacitor 34 will generate a voltage which changes the state of the digital output signal generated by the Schmitt buffer 30.

Figure 4:
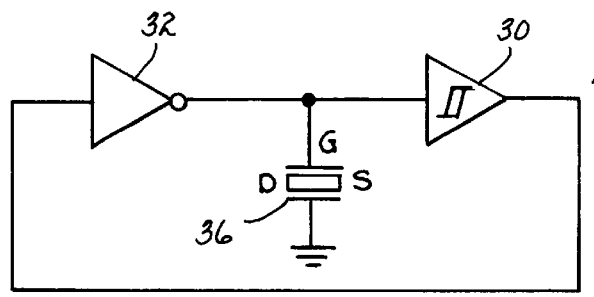
FIG. 4 is a simplified electrical schematic of a second embodiment of a temperature sensitive oscillator used in the time-based temperature sensing system depicted in FIG. 1.

Referring to FIG. 4, wherein like numerals and symbols represent like elements, a second embodiment of the temperature sensitive oscillator 12 is shown. This embodiment is very similar to the embodiment depicted in FIG. 3. However, in this embodiment, the capacitor 34 (FIG. 3) is replaced with a MOS transistor 36. The MOS transistor 36 operates in the triode region with a capacitance that increases with temperature. The weak inverting stage 32 has a saturation current which decreases with temperature. The combination of the two leads to a large frequency temperature coefficient.

Figure 5:
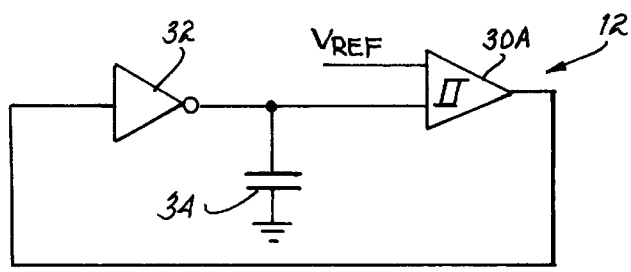
FIG. 5 is a simplified electrical schematic of a third embodiment of a temperature sensitive oscillator used in the time-based temperature sensing system depicted in FIG. 1.

Referring to FIG. 5, wherein like numerals and symbols represent like elements, a third embodiment of the temperature sensitive oscillator 12 is shown. This embodiment is very similar to the embodiment depicted in FIG. 3. Like the embodiment shown in FIG. 3, a Schmitt buffer 30A is used for generating a digital output signal. In this embodiment, the Schmitt buffer 30A has an input coupled to a temperature independent reference voltage and a second input which is coupled to the output of the weak inverting stage 32. The output of the Schmitt buffer 30A is coupled to an input of the weak inverting stage 32. The weak inverting stage 32 has an output charging current which varies linearly as a function of temperature. A capacitor 34 is coupled to the output of the weak inverting stage 32. The capacitor 34 will generate a voltage which changes the state of the digital output signal generated by the Schmitt buffer 30. This implementation will provide a means for improving the linearity and precision of the temperature sensitive oscillator 12 depicted in FIG. 3.

OPERATION

Figure 2:
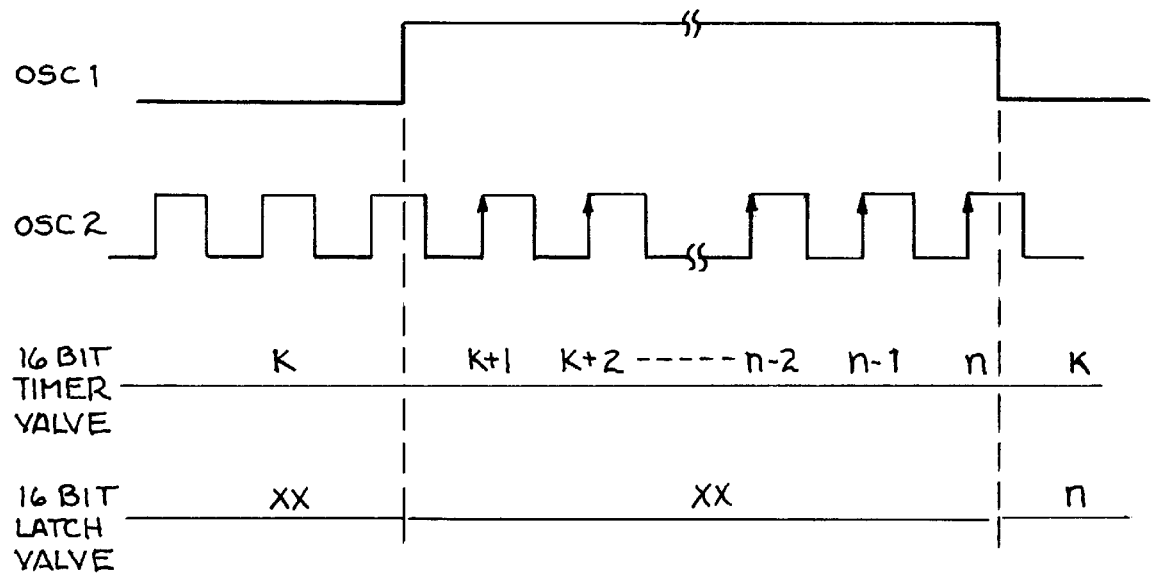
FIG. 2 is a timing diagram of the time-based temperature sensing system depicted in FIG. 1.

Referring to FIGS. 1 and 2, the operation of system 10 will be discussed. As can be seen from the timing diagram shown in FIG. 2, when the output of the first oscillator 12 is low, the timer 18 is not enabled and the number stored in the timer 18 will stay at a starting initial value. When the output of the first oscillator 12 goes high, the timer 18 becomes enabled. The timer 18 will then be incremented from its starting initial value on each rising edge of the clock signal outputted by the second oscillator 14. In accordance with one embodiment of the present invention, when the output of the first oscillator 12 goes low, the timer 18 is disabled. The number stored in the timer 18 is loaded into the latch 20 and the timer 18 is then reset to an initial starting value. The number stored in the latch is proportional to the ratio between the frequency of the first oscillator 12 and the second oscillator 14 which is further proportional to the temperature of the material being monitored. Since the frequency of the first oscillator 12 will vary linearly with temperature, a straight line equation may be used to calculate the current temperature.

In accordance with another embodiment of the present invention, the timer 18 has a signalling circuit 22 for generating an interrupt signal. The signalling circuit 22 will generate an interrupt signal when the number stored in the timer 18 exceeds a maximum predetermined value or is below a minimum predetermined value. The maximum predetermined value being proportional to a maximum temperature value and the minimum predetermined value being proportional to a minimum temperature value. Instead of resetting the number stored in the timer 18, a register 24 is used for loading an initial starting value into the timer 18. In this embodiment, the system 10 will continuously monitor the temperature. When the current number in the timer 18 exceeds the preset maximum value and/or is below the minimum value, the signalling circuit 22 of the timer 18 will generate the interrupt signal. The interrupt signal could be used to generate an alarm signal, turn off the equipment using the system 10, or any of a number of other applications. When the current number stored in the timer 18 is below the maximum value or is above the minimum value, no interrupt signal will be generated, and the equipment using the system 10 will operate uninterrupted.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A time-based digital temperature sensing system comprising, in combination:

a first oscillator which is temperature sensitive and has a temperature coefficient which allows said first oscillator to generate an output signal which has a period which varies approximately linearly as a function of temperature;

a second oscillator which generates a reference clock signal;

timer means having a clock input coupled to an output of said second oscillator and an enable input coupled to an output of said first oscillator for generating a number indicative of a length of time said timer means is enabled by said first oscillator wherein said number is approximately proportional to a current temperature of a material being measured by said temperature sensing system, said timer means generates said number indicative of a length of time said timer means is enabled by said first oscillator by counting rising edges of said reference clock signal of said second oscillator when said timer means is enabled by said first oscillator, said timer means having a reset/load input coupled to said output of said first oscillator for at least one of resetting said number indicative of a length of time said timer means is enabled to an initial value when said timer means is disabled by said first oscillator and for signalling said timer means to load a starting initial value into said timer means for said timer means to generate said number indicative of said length of time said timer means is enabled; and latch means having an input coupled to said timer means and a load input coupled to said output of said first oscillator for loading and storing said number indicative of said length of time said timer means is enable prior to said number being reset by said reset input.

2. A time-based digital temperature sensing system in accordance with claim 1 wherein said timer means further comprises signalling means for generating a signal when said number indicative of a length of time said timer means is enabled is at least one of greater than a predetermined value indicative of a maximum temperature value and less than a predetermined number indicative of a minimum temperature value.

3. A time-based digital temperature sensing system in accordance with claim 1 further comprising register means coupled to said timer means for loading said starting initial value into said timer means.

4. A time-based digital temperature sensing system in accordance with claim 1 further comprising voltage regulator means coupled to said first oscillator for supplying a constant operating voltage to said first oscillator so that said output signal generated by said first oscillator is independent of operating voltage fluctuations.

5. A time-based digital temperature sensing system in accordance with claim 1 further comprising voltage regulator means coupled to said second oscillator for supplying a constant operating voltage to said second oscillator so that said reference clock signal outputted by said second oscillator is independent of operating voltage fluctuations.

6. A time-based digital temperature sensing system in accordance with claim 1 wherein said first oscillator comprises:
   Schmitt buffer means for generating a digital output signal;
   inverting stage means having an input coupled to an output of said Schmitt buffer which is biased for generating an output charging current which varies approximately linearly as a function of temperature;
   capacitor means coupled to an output of said inverting means for generating a voltage which changes a state of said digital output signal generated by said Schmitt buffer means.

7. A time-based digital temperature sensing system in accordance with claim 6 wherein said Schmitt buffer means has an input coupled to a temperature independent reference voltage for improving the linearity and precision of said first oscillator.

8. A time-based digital temperature sensing system in accordance with claim 6 wherein said capacitor means is a MOS transistor having a gate coupled to said output of said inverting means and having a capacitance which varies with temperature.

9. A time-based digital temperature sensing system in accordance with claim 1 wherein said second oscillator is a temperature stable oscillator.

10. A time-based digital temperature sensing system in accordance with claim 1 wherein said second oscillator is a temperature sensitive oscillator having a temperature coefficient different from said temperature coefficient of said first oscillator.

11. A time-based digital temperature sensing system in accordance with claim 1 further comprising control means coupled to said timer means and to said latch means f or coordinating operating of said system.

12. A time-based digital temperature sensing system in accordance with claim 11 wherein said control means coordinates between a transfer of said number indicative of a length of time said timer means is enabled and resetting said number to an initial value when said timer means is disabled by said first oscillator.

13. A time-based digital temperature sensing system in accordance with claim 1 further comprising frequency divider means having an input coupled to an output of said first oscillator and an output coupled to enable input of said timer means for slowing down said output signal of the first oscillator.

14. A method of providing a time-based digital temperature sensing system comprising the steps of:
   providing a first oscillator which is temperature sensitive and has a temperature coefficient which allows said first oscillator to generate an output signal which varies approximately linearly as a function of temperature;
   providing a second oscillator which generates a reference clock signal;
   providing timer means having a clock input coupled to an output of said second oscillator and an enable input coupled to an output of said first oscillator for generating a number indicative of a length of time said timer means is enabled by said first oscillator wherein said number is approximately proportional to a current temperature of a material being measured by said temperature sensing system, said timer means generates said number indicative of a length of time said timer means is enabled by said first oscillator by counting rising edges of said reference clock signal of said second oscillator when said timer means is enabled by said first oscillator, said timer means having a reset/load input coupled to said output of said first oscillator for at least one of resetting said number indicative of a length of time said timer means is enabled to an initial value when said timer means is disabled by said first oscillator and for signalling said timer means to load a starting initial value into said timer means for said timer means to generate said number indicative of said length of time said timer means is enabled; and
   providing latch means having an input coupled to said timer means and a load input coupled to said output of said first oscillator for loading and storing said number indicative of said length of time said timer means is enable prior to said number being reset by said reset input.

15. The method of claim 14 wherein said step of providing timer means further comprises the step of providing signalling means for generating a signal when said number indicative of a length of time said timer means is enabled is at least one of greater than a predetermined value indicative of a maximum temperature value and less than a predetermined number indicative of a minimum temperature value.

16. The method of claim 14 further comprising the step of providing voltage regulator means coupled to said first oscillator and to said second oscillator for supplying a constant operating voltage to said first oscillator and to said second oscillator so that said output signal generated by said first oscillator is independent of operating voltage fluctuations and said reference clock signal outputted by said second oscillator is independent of operating voltage fluctuations.

17. The method of claim 14 wherein said step of providing a first oscillator further comprises the steps of:
   providing Schmitt buffer means for generating a digital output signal;
   providing inverting stage means having an input coupled to an output of said Schmitt buffer which is biased for generating an output charging current which varies approximately linearly as a function of temperature;
   providing capacitor means coupled to an output of said inverting means for generating a voltage which changes a state of said digital output signal generated by said Schmitt buffer means.

18. The method of claim 17 wherein said step of providing Schmitt buffer means further comprises the step of providing a Schmitt buffer means having an input coupled to a temperature independent reference voltage for improving the linearity and precision of said first oscillator.

19. The method of claim 17 wherein said step of providing capacitor means further comprises the step of providing a MOS transistor having a gate coupled to said output of said inverting means and having a capacitance which varies with temperature.

20. The method of claim 14 wherein said step of providing a second oscillator further comprises the steps of providing a temperature stable oscillator.

21. The method of claim 14 wherein said step of providing a second oscillator further comprises the step of providing a second oscillator which is a temperature sensitive oscillator having a temperature coefficient different from said temperature coefficient of said first oscillator.

22. The method of claim 14 further comprising the step of providing control means coupled to said timer means and to said latch means for coordinating operating of said system.

23. The method of claim 22 wherein said step of providing control means further comprises the step of providing control means for coordinating between a transfer of said number indicative of a length of time said timer means is enabled and resetting said number to an initial value when said timer means is disabled by said first oscillator.

24. The method of claim 14 further comprising the step of providing frequency divider means having an input coupled to an output of said first oscillator and an output coupled to enable input of said timer means for slowing down said output signal of the first oscillator.

* * * * *